(12) United States Patent
Kitami et al.

(10) Patent No.: US 7,827,869 B2
(45) Date of Patent: Nov. 9, 2010

(54) MULTIPHASE FLOWMETER FOR MEASURING EACH PHASE FLOW RATE OF A THREE-PHASE FLOW CONSISTING OF GAS AND TWO KINDS OF LIQUID

(75) Inventors: Hirokazu Kitami, Tokyo (JP); Hiraku Kawaoto, Tokyo (JP)

(73) Assignee: Oval Corporation, Tokyo (JP)

( * ) Notice: Subject to any disclaimer, the term of this patent is extended or adjusted under 35 U.S.C. 154(b) by 108 days.

(21) Appl. No.: 12/309,349

(22) PCT Filed: Aug. 7, 2007

(86) PCT No.: PCT/JP2007/065796

§ 371 (c)(1),
(2), (4) Date: Jan. 15, 2009

(87) PCT Pub. No.: WO2008/050522

PCT Pub. Date: May 2, 2008

(65) Prior Publication Data
US 2009/0199653 A1    Aug. 13, 2009

(30) Foreign Application Priority Data
Oct. 27, 2006    (JP) .............................. 2006-292835

(51) Int. Cl.
*G01F 1/74*    (2006.01)
*G01N 9/32*    (2006.01)
(52) U.S. Cl. .................................... 73/861.04; 73/32 R
(58) Field of Classification Search .................. None
See application file for complete search history.

(56) References Cited

U.S. PATENT DOCUMENTS 2,954,692 A * 10/1960 Hornfeck .................. 73/861.02

(Continued)

FOREIGN PATENT DOCUMENTS

JP            59-31438         2/1984

(Continued)

OTHER PUBLICATIONS

International Search Report mailed Oct. 2, 2007 for International Application No. PCT/JP2007/065796.

*Primary Examiner*—Harshad Patel
(74) *Attorney, Agent, or Firm*—Wenderoth, Lind & Ponack, L.L.P.

(57) ABSTRACT

In order to extract a part of a three-phase flow from a pipe line, a pair of communication pipes, which are connected to upstream and downstream sides of an orifice provided in the pipe line, and a gas-liquid extraction tank are used. Flowing of a slag flow or the like into the pipe line causes a periodical change in a pressure difference between input and output sides of the orifice. This causes extraction of gas-liquid and discharge mainly of gas to be simultaneously effected in the pair of communication pipes and the gas-liquid extraction tank. Within the gas-liquid extraction tank, the gas-liquid is forcibly shaken horizontally, vertically, etc. for agitating, whereby gas-liquid of high liquid-phase rate remains. Then, the gas is removed from this gas-liquid of high liquid-phase rate to thereby extract mixture liquid, which is accumulated in a liquid storage tank. The mixture liquid flows from the liquid storage tank in an amount required at a Coriolis meter. As a result, high precision density measurement is performed at the Coriolis meter.

4 Claims, 11 Drawing Sheets

U.S. PATENT DOCUMENTS 4,881,412 A * 11/1989 Northedge ............... 73/861.04
2007/0193373 A1 * 8/2007 Xie et al. ................. 73/863.03

FOREIGN PATENT DOCUMENTS

| | | |
|---|---|---|
| JP | 8-201130 | 8/1996 |
| JP | 10-281846 | 10/1998 |
| JP | 2000-249673 | 9/2000 |
| JP | 2001-165741 | 6/2001 |
| JP | 2003-513234 | 4/2003 |
| JP | 2005-3532 | 1/2005 |

* cited by examiner

MEASUREMENT OF OIL/WATER DENSITY
IN OIL/WATER VAPOR BY CORIOLIS METER
QL 4~15m3/h, β 0~85%, α 5~30%

MULTIPHASE FLOWMETER FOR MEASURING EACH PHASE FLOW RATE OF A THREE-PHASE FLOW CONSISTING OF GAS AND TWO KINDS OF LIQUID

BACKGROUND OF THE INVENTION

I. Technical Field

The present invention relates to a multi-phase flowmeter for measuring each phase flow rate of a three-phase flow consisting of gas and two kinds of liquid.

II. Description of the Related Art

Petroleum produced from a well in a deep-sea area or the like forms a mixed-phase flow containing oil, water, and gas (which is a three-phase flow, hereinafter referred to as a multi-phase flow). Without separating those phases from each other, the petroleum is transferred under high pressure to the land, and then undergoes a development-well extraction process before being refined through separation. The oil and gas thus obtained through separation and refinement are transferred to a destination, with the water being discharged. Prior to the development-well extraction process, flow rate measurement for each phase is effected as needed on the multi-phase fluid for the purpose of development-well management and extraction or shipping management.

Regarding this flow rate measurement for each phase, there has been disclosed, for example, in the prior-art section of JP 2001-165741 A, a method based on a cross-correlation method utilizing a density meter and an ultrasonic flowmeter. In the disclosed technology, a gamma ray density meter is used as the density meter. As is known, the gamma ray density meter is expensive. In the cross-correlation method, the average density of the gas-liquid two-phase flow is measured by using the gamma ray density meter, and a void fraction is obtained from the measured average density. Then, from the void fraction and the volumetric flow rate of the multi-phase fluid measured by the ultrasonic flowmeter, each flow rate is obtained. In this case, by further adding an element for measuring a water content, it is possible to measure the flow rate of the oil and water. However, like the gamma ray density meter, the element for measuring a water cut is very expensive. Further, in most cases, it presupposes execution of calibration in the field, and hence there is a problem of a further increase in cost.

Apart from this, regarding the flow rate measurement of a multi-phase flow, there is known a method in which the multi-phase flow is turned into single-phase flows of gas, oil, water, etc. by a phase separation process (three-phase separation tank), and then the gas flow rate and the flow rates of the oil and water are measured (see JP 2003-513234 A). However, this measurement of each phase flow rate has a problem in that it involves high equipment cost for phase separation. In addition to the high equipment cost, the method has a problem in that the equipment is rather large and cannot be easily transferred to a place where it is needed.

Apart from this, JP 2003-513234 A discloses a technology regarding a density meter and the like. Application of this disclosed technology may help solve the above-mentioned problem of high cost through utilization of the disclosed technology regarding the density meter as disclosed in JP 2003-513234 A instead of the gamma type density meter. In JP 2003-513234 A, there are used Coriolis mass flowmeters as the flow meter and the density meter. It should be noted that a Coriolis mass flowmeter cannot simply be applied instead of the gamma type density meter. Further, the problem in JP 2003-513234 A should also be taken into account. Thus, in the following, the construction and operation of the multi-phase flowmeter of JP 2003-513234 A are briefly described.

In FIG. 11, a multi-phase flow measurement system (which corresponds to a multi-phase flowmeter) 100 includes a vortex separator 104, and an incoming multi-phase flow line 102 discharging a multi-phase fluid into the vortex separator 104. The vortex separator 104 discharges gas into an upper gas measurement flow line 106, and discharges liquid into a lower liquid measurement flow line 108. After flow measurement, the gas measurement flow line 106 and the liquid measurement flow line 108 join together again at a discharge flow line 110. Before the discharge flow line 110 reaches a sale site, the discharge flow line 110 extends to a three-phase production separator 118, making it possible to effect separation into a gas phase, a water phase, and an oil phase.

The multi-phase flow measurement system 100 is provided with a production manifold 116. The production manifold 116 is supplied with a multi-phase fluid from a plurality of oil wells or gas wells. The incoming multi-phase flow line 102 receives the multi-phase fluid from the production manifold 116 in the direction of the arrow 120. In the incoming multi-phase flow line 102, reference numeral 122 denotes a venturi section, reference numeral 124 denotes an incline/decline section, and reference numeral 126 denotes a horizontal discharge element with respect to the vortex separator 104.

The horizontal discharge element 126 is arranged so as to discharge the multi-phase fluid tangentially into the cylindrical interior separation section of the vortex separator 104. As is known, when the multi-phase fluid is discharged from the horizontal discharge element 126, a tornado effect or a cyclone effect is generated in a liquid portion 128 in the vortex separator 104 as a result of the discharge. The entire multi-phase fluid is discharged into the vortex separator 104 via the horizontal discharge element 126.

The liquid portion 128 is a majority liquid phase including the water phase and the oil phase obtained through separation and an entrained gas phase. The entrained gas phase is separated from the liquid portion 128 by a centrifugal force generated by a cyclone effect. The entrained gas phase cannot be completely removed except in the case of a relatively low flow rate allowing additional gravity separation of this entrained gas phase. In other words, in the case of a high flow rate, the entrained gas phase cannot be removed. The liquid portion 128 is discharged into the liquid measurement flow line 108 from the vortex separator 104.

A gas portion 132 in the vortex separator 104 is a majority gas phase including gas along with a mist consisting of oil and water. The vortex separator 104 is provided with a mist collecting screen 134 for causing partial condensation of the mist. The gas portion 132 is discharged into the gas measurement flow line 106.

The gas measurement flow line 106 is provided with a Coriolis mass flowmeter 154. The Coriolis mass flowmeter 154 provides measurement values of mass flow rate and density from the gas portion 132 of the multi-phase fluid inside the gas measurement flow line 106. The Coriolis mass flowmeter 154 is connected to a flow transmitter 156, and a signal indicating a measurement value is output to a controller 112. The gas measurement flow line 106 is provided with a check valve 160. The check valve 160 assures a positive flow in the direction of the arrow 162, whereby intrusion of the liquid portion 128 into the gas measurement flow line 106 is prevented.

The liquid measurement flow line 108 is provided with a static mixer 164. Further, on the output side of the static mixer 164, there are provided a Coriolis mass flowmeter 166 and a water cut monitor 172. The Coriolis mass flowmeter 166 provides measurement values of mass flow rate and density from the liquid portion 128 inside the liquid measurement flow line 108. The Coriolis mass flowmeter 166 is connected to a flow rate transmitter 168, and a signal indicating a measurement value is output to the controller 112. The water cut monitor 172 measures the water cut rate of the liquid portion 128 inside the liquid measurement flow line 108. The water cut monitor 172 is connected to the controller 112.

The liquid measurement flow line 108 is provided with a check valve 178. The check valve 178 assures a positive flow in the direction of the arrow 180, whereby it is possible to prevent intrusion of the gas portion 132 into the liquid measurement flow line 108. Reference numerals 150 and 174 denote valves controlled to be opened/closed by the controller 112.

The production manifold 116 has valves 182 and 184 controlled via a path 190. The valves 182 and 184 are selectively constructed such that a multi-phase fluid from an oil well 186 or from a well combination (e.g., oil well 186 and gas well 188) is caused to flow through a rail 192 and distributed to the incoming multi-phase flow line 102. The other valves are selectively constructed such that the fluid is caused to flow through a bypass flow line 194 to thereby bypass the multi-phase flow measurement system 100.

Reference numerals 196 and 197 denote manual valves. A bypass line 198 on the inner side of the valves 196 and 197 causes the flow to bypass the multi-phase flow measurement system 100 when a valve 199 is opened and the valves 150 and 174 are closed. The multi-phase flow measurement system 100 is constructed as described above.

JP 08-201130 A discloses a prior-art technology for measuring the flow rate of a two-phase fluid consisting of liquid and gas, etc. More specifically, the publication discloses a technology regarding a turbine flowmeter adapted to measure the flow rate of a two-phase fluid consisting of liquid and gas while the fluid is a mixed-phase flow (mixture liquid) consisting of liquid and gas. The turbine flowmeter has a function similar to that of the ultrasonic flowmeter described above, and can replace the same. As is known, there is attained an effect that the turbine flowmeter can perform measurement at low cost with an apparatus having a simple structure and being superior in durability. Apart from the turbine flowmeter and the ultrasonic flowmeter, an orifice flowmeter is also known.

SUMMARY OF THE INVENTION

The inventor of the subject application has found out that the conventional multi-phase flow measurement system 100 described above involves a problem regarding the vortex separator 104 for separation into a gas phase and a liquid phase and the peripheral structure thereof and that it cannot be simply applied to replace a gamma ray density meter. That is, in the multi-phase flow measurement system 100, the multi-phase fluid is entirely discharged into the vortex separator 104 via the rail 192. It should be noted, however, that the fact that the multi-phase fluid is entirely discharged into the vortex separator 104 means that there is generated a vortex, with a large number of bubbles being contained in the liquid portion 128.

The inventor of the subject application believes that, with the cyclone effect of the vortex separator 104 alone, relatively small bubbles are swallowed up by the vortex to be allowed to flow into the liquid measurement flow line 108 (If collision between the bubbles occurs to cause the bubbles to grow in size, gas-liquid separation proceeds. However, in the free vortex generated in the separator, the speed ratio becomes higher at the nearer to the center of the free vortex, and hence the pressure near the center is relatively low, and there is the possibility of the small bubble group being attracted to the liquid measurement pipe 108 side. This is particularly conspicuous when gravity separation is impossible). Thus, the Coriolis mass flowmeter 166 performs density measurement on the liquid portion 128 in the liquid measurement flow line 108 in a state in which the liquid portion contains a large number of small bubbles. The density measurement value obtained in the state in which a large number of small bubbles are contained differs from that obtained in the state in which no bubbles are contained, resulting in an error in measurement. Thus, the subsequent calculation of the flow rate is affected.

If the technology as disclosed in JP 2003-513234 A regarding a density meter is applied in place of a gamma ray density meter, the calculation of the flow rate is affected.

The present invention has been made in view of the above-mentioned problem. It is an object of the present invention to provide a multi-phase flowmeter capable of highly accurate flow rate measurement.

In order to solve the above-mentioned problem, a multi-phase flowmeter according to a first aspect of the present invention includes: a gas-liquid two-phase flow rate measurement portion for measuring an each-phase flow rate of a gas-liquid two-phase flow in a three-phase flow consisting of gas and two kinds of liquid; a mixture liquid density measurement portion for measuring a mixture density of mixture liquid as a liquid phase of the gas-liquid two-phase flow; and an each-phase flow rate calculating portion which obtains a mixing ratio of the mixture liquid from the mixture density and which calculates each flow rate of the mixture liquid from the mixing ratio and the mixture liquid flow rate, in which the mixture liquid density measurement portion includes a mixture liquid extraction portion and a density measurement portion connected to the mixture liquid extraction portion, in which the mixture liquid extraction portion includes a pressure difference generator provided in a pipe line through which the three-phase flow is passed, a pair of communication pipes connected to upstream and downstream sides of the pressure difference generator, a gas-liquid extraction tank which serves as a place connected to the pair of communication pipes and adapted to take in a part of the three-phase flow and which serves as a place utilizing a change in pressure between input and output sides of the pressure difference generator to forcibly agitate the part of the three-phase flow, a gas-liquid discharge pipe connected to the gas-liquid extraction tank and adapted to discharge gas including the liquid phase, a liquid storage tank connected to the gas-liquid extraction tank and adapted to take in at least the mixture liquid for density measurement required at the density measurement portion and to store the same, and a liquid flow rate adjustment valve provided at least on a downstream side of the liquid storage tank, and in which the density measurement portion includes a density measurement portion main body adapted to perform density measurement by using the mixture liquid for density measurement, and a gas-liquid return pipe connected to the density measurement portion main body and the pipe line.

According to the present invention, which is endowed with the above-mentioned features, a part of the three-phase flow taken into the gas-liquid extraction tank is forcibly agitated by a change in pressure between the input and output sides of the orifice (pressure difference generator). That is, the part of the three-phase flow taken in is forcibly shaken horizontally, vertically, etc. to be agitated. At this time, the bubbles contained in the mixture liquid grow into larger bubbles through collision between them, and are separated from the mixture liquid to the gas-phase side. Due to the forcible agitating action, even in the case of small bubbles, the bubbles can be easily separated from the mixture liquid to the gas-phase side.

According to the present invention, the mixture liquid from which bubbles have been separated is accumulated in the liquid storage tank through adjustment of the liquid flow rate adjustment valve. The mixture liquid accumulated in the liquid storage tank is used for the density measurement. Density measurement is performed on the mixture liquid from which bubbles have been separated, and hence it is possible to provide a measurement value of high precision.

According to the present invention, it is only necessary for the liquid storage tank to be capable of taking in at least the mixture liquid required in the density measurement portion and accumulating the same. Thus, there is no need for the gas-liquid extraction tank to effect gas-liquid separation on all of the part of the three-phase flow taken in. It is only necessary for the gas-liquid extraction tank to be capable of removing the gas in an amount large enough to allow the mixture liquid required at the density measurement portion to be supplied to the liquid storage tank.

According to the present invention, in order to measure the density of the liquid phase, not all but a part of the three-phase flow is taken in the gas-liquid extraction tank. It is not all the three-phase flow that is taken in. As a result, it is possible to reduce the size of the mixture density measurement portion, and hence it is possible to reduce the overall size of the multi-phase flowmeter.

According to a second aspect of the present invention, in the multi-phase flowmeter according to the first aspect of the present invention, the gas-liquid two-phase flow is a slag flow, a bubble flow, or a linear flow.

According to the present invention, endowed with the above-mentioned features, the gas-liquid two-phase flow in the mixed-phase flow (three-phase flow) consisting of oil, water, and gas produced from the well is typically a slag flow, a bubble flow, or a linear flow. When those flows flow, the change in pressure between the input and output sides of the orifice in the mixture liquid density measurement portion becomes more conspicuous.

According to a third aspect of the present invention, in the multi-phase flowmeter according to the first or second aspect of the present invention, the mixture liquid density measurement portion, or the mixture liquid density measurement portion and the gas-liquid two-phase flow rate measurement portion, are detachable with respect to the pipe line.

According to the present invention, endowed with the above-mentioned features, through transfer of the flowmeter to a place where it is required, it is possible to perform flow rate measurement for, for example, management of a development well and an extraction process or shipment management.

According to the present invention, there is attained an effect that it is possible to provide a multi-phase flowmeter capable of performing flow rate measurement with high precision.

DETAILED DESCRIPTION OF THE INVENTION

Figure 1:
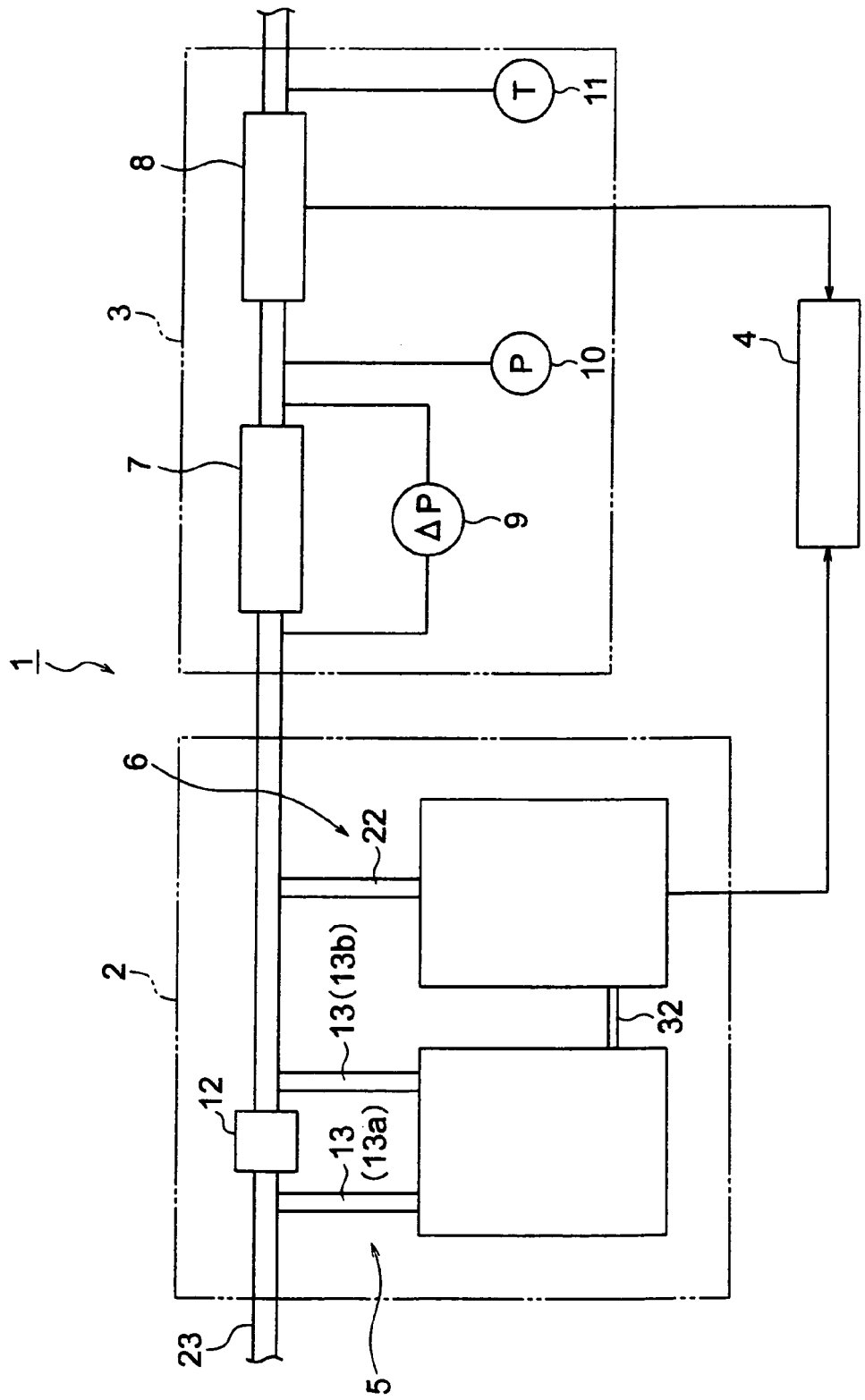
FIG. 1 is a structural diagram of a multi-phase flowmeter according to an embodiment of the present invention.
Figure 2:
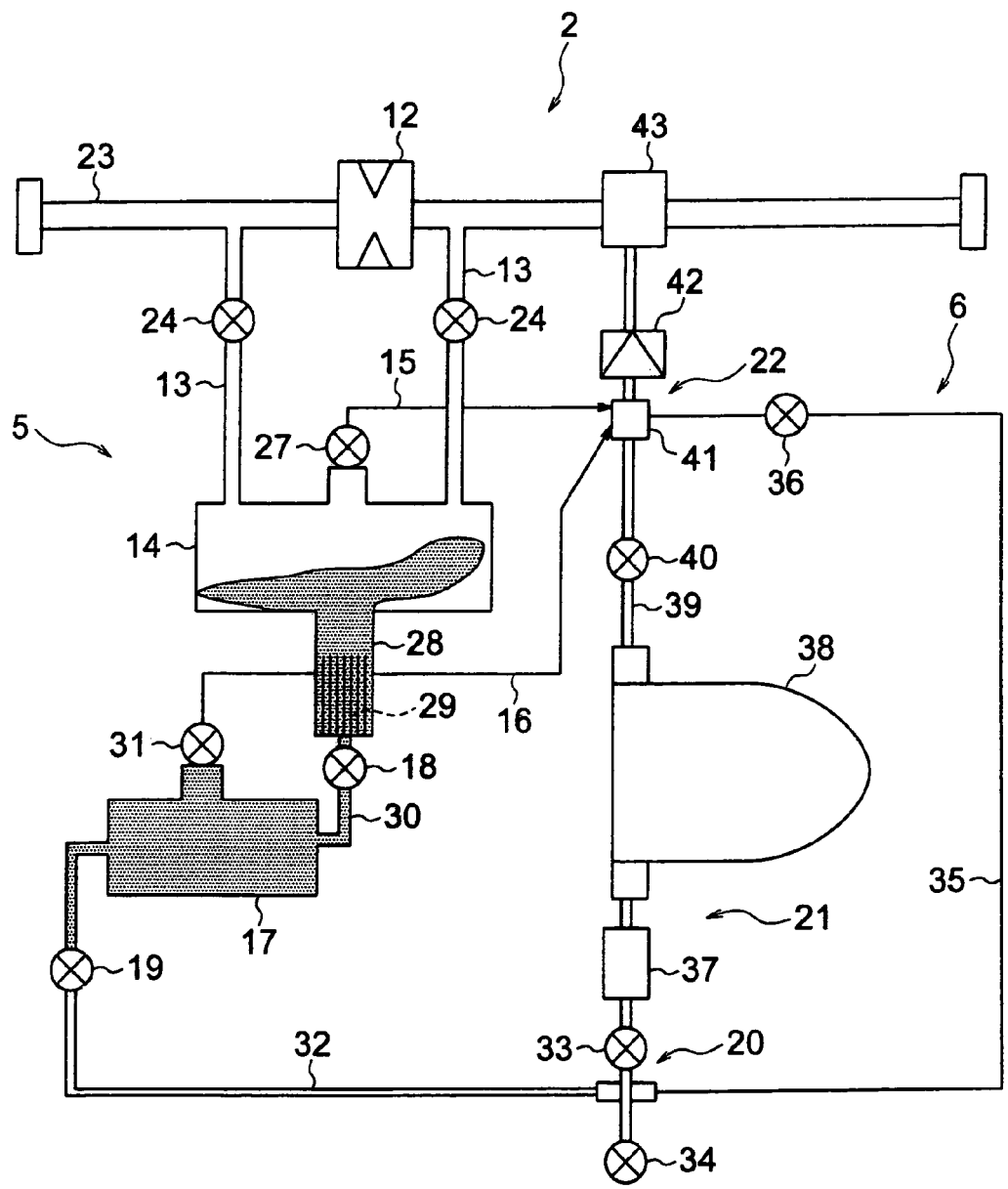
FIG. 2 is a structural diagram of a mixture liquid density measurement portion.
Figure 3:
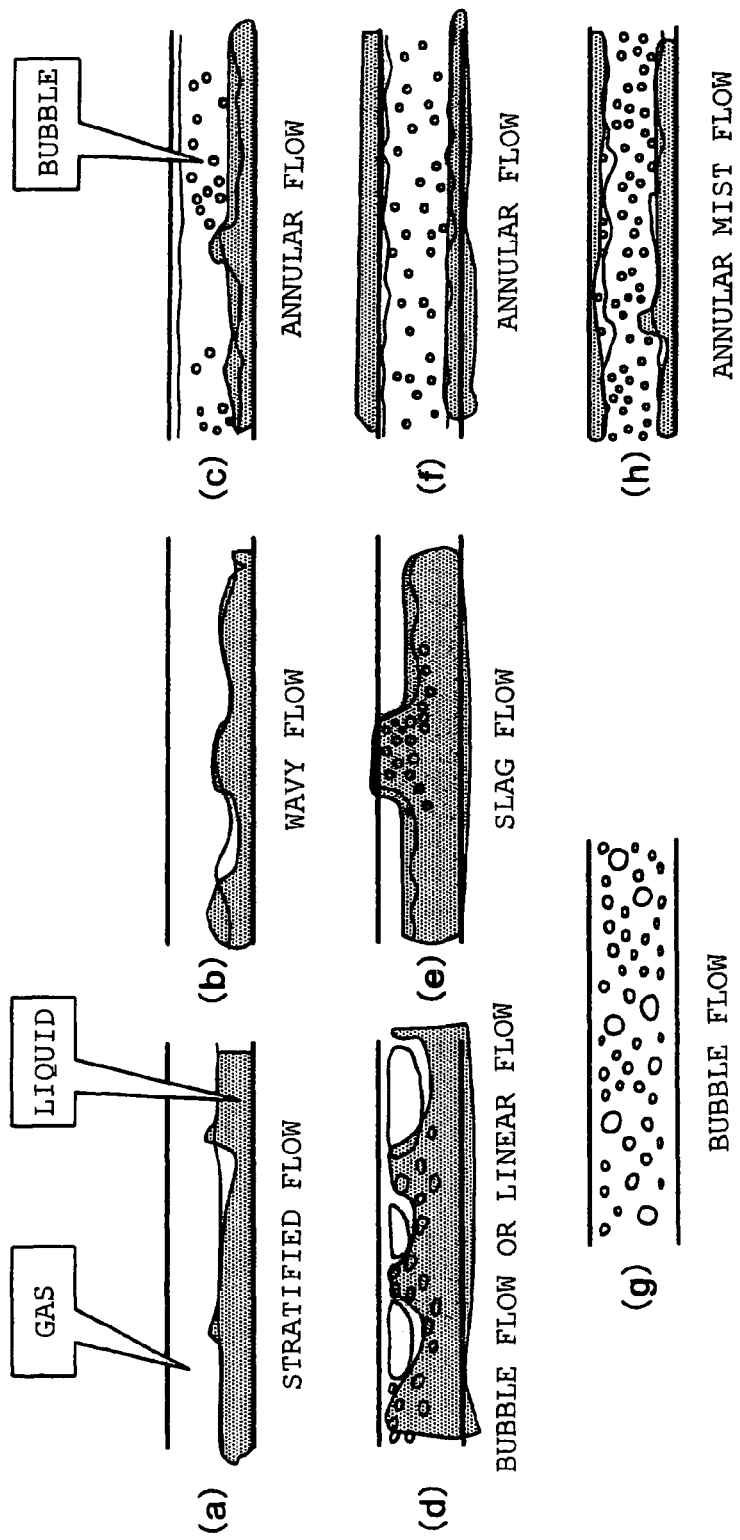
FIG. 3 is an explanatory view illustrating manners of flowing of a gas-liquid two-phase flow in a horizontal pipe.
Figure 4:
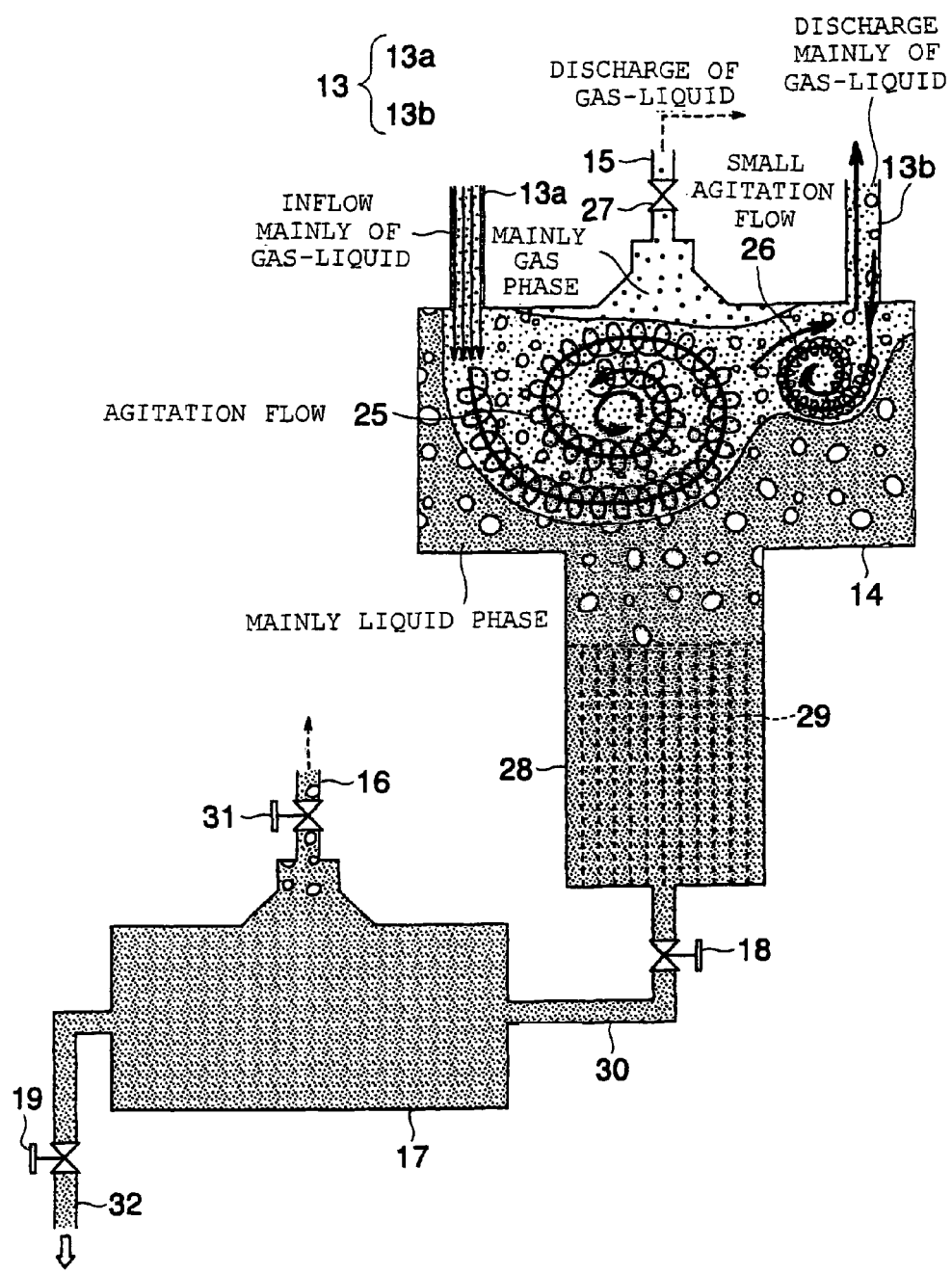
FIG. 4 is an explanatory view illustrating the condition in a gas-liquid extraction tank.
Figure 5:
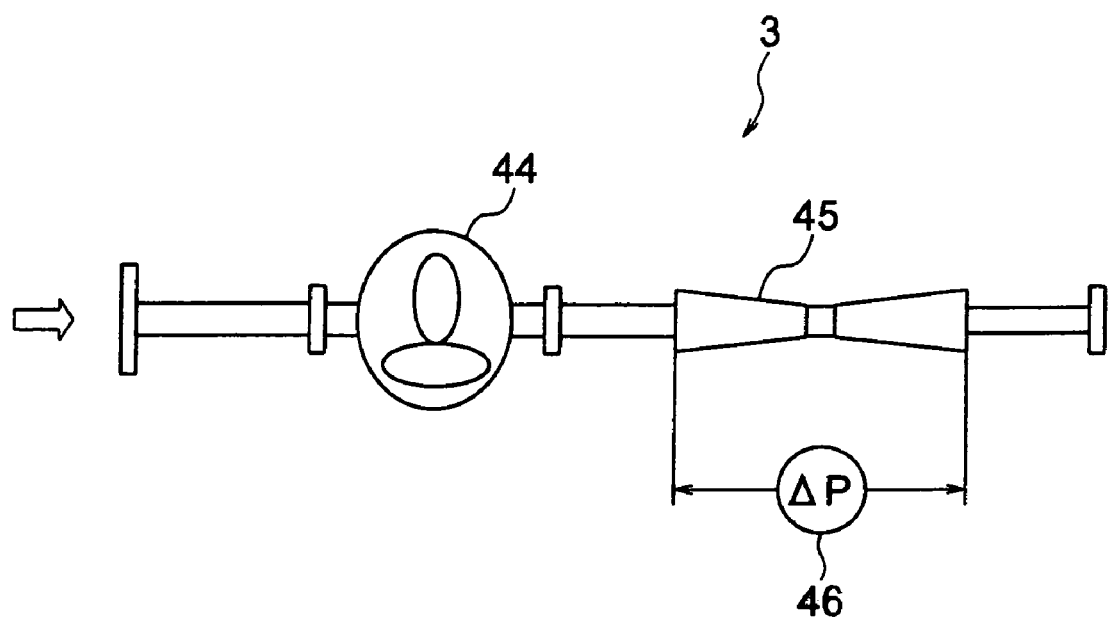
FIG. 5 is a structural diagram of another example of the gas-liquid two-phase flow rate measurement portion.
Figure 6:
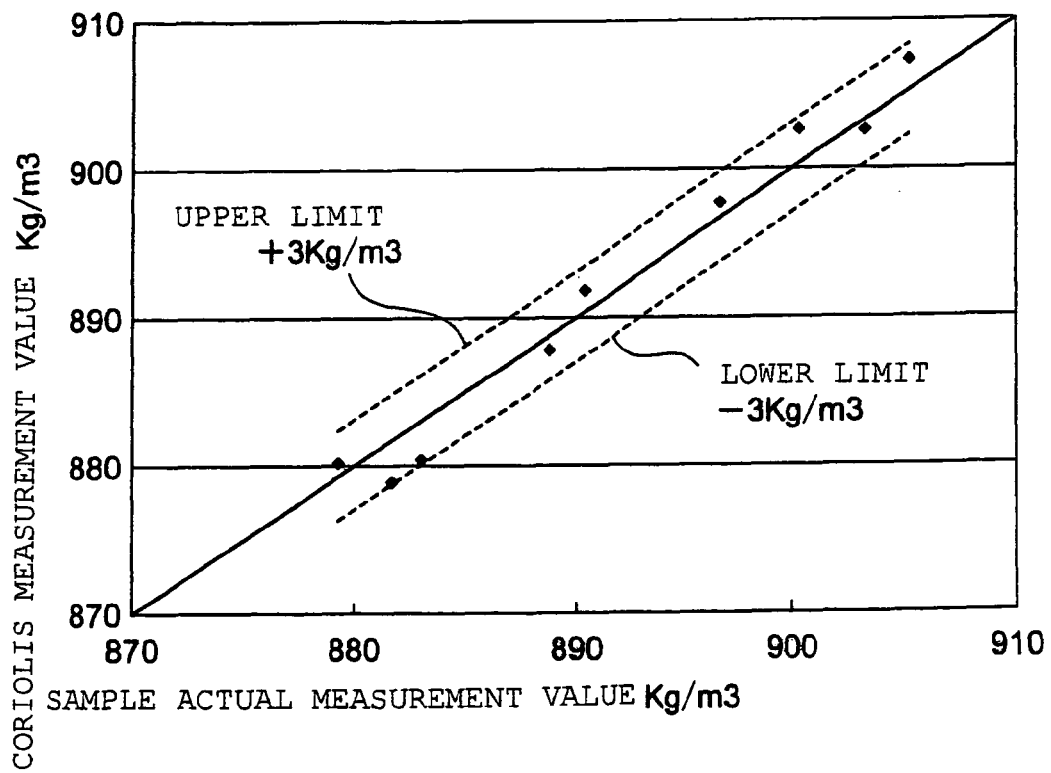
FIG. 6 is a graph illustrating results of measurement of the density of oily water in oily water vapor obtained by a Coriolis meter.
Figure 7:
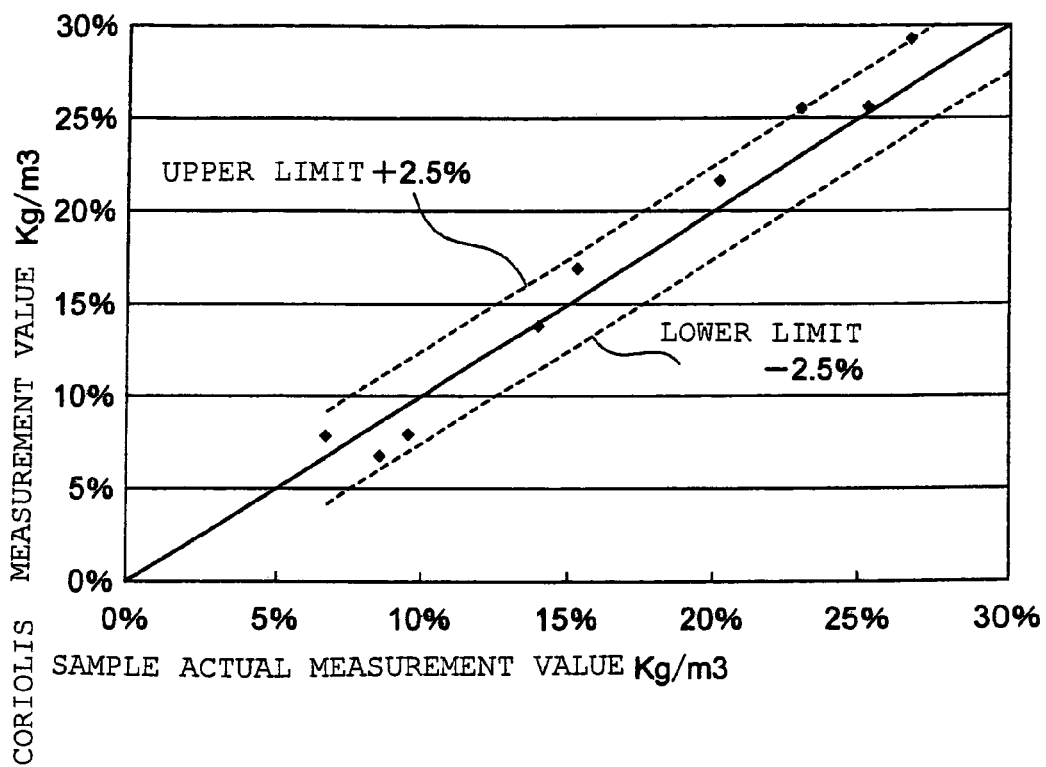
FIG. 7 is a graph illustrating results of measurement of the water content (water/oil) in oily water vapor obtained by a Coriolis meter.

In the following, the present invention is described with reference to the drawings. FIG. 1 is a structural diagram of a multi-phase flowmeter according to an embodiment of the present invention. FIG. 2 is a structural diagram of a mixture liquid density measurement portion, FIG. 3 is an explanatory view illustrating manners of flowing of a gas-liquid two-phase flow in a horizontal pipe, FIG. 4 is an explanatory view illustrating the condition in a gas-liquid extraction tank, FIG. 5 is a structural diagram of another example of the gas-liquid two-phase flow rate measurement portion, FIG. 6 is a graph illustrating results of measurement of the density of oily water in oily water vapor obtained by a Coriolis meter, and FIG. 7 is a graph illustrating results of measurement of the water cut (water/oil) in oily water vapor obtained by a Coriolis meter.

In FIG. 1, a multi-phase flowmeter 1 according to the present invention includes a mixture liquid density measurement portion 2, a gas-liquid two-phase flow rate measurement portion 3, and an each-phase flow rate calculating portion 4. The mixture liquid density measurement portion 2 of the multi-phase flowmeter 1 constructed as described above is provided with a mixture liquid extraction portion 5 and a density measurement portion 6. The gas-liquid two-phase flow rate measurement portion 3 is capable of measuring each-phase flow rate of a gas-liquid two-phase flow in a three-phase flow consisting of gas and two kinds of liquid (e.g., gas, oil, and water), and there are no particular limitations regarding this measurement portion. This embodiment employs a turbine type gas-liquid two-phase flowmeter (e.g., turbine flowmeter as disclosed in Patent Document 3 in the background art section is to be suitably used). The gas-liquid two-phase flow rate measurement portion 3 is provided with a homogenizer 7, a turbine meter 8, a differential pressure gage 9, a pressure gage 10, and a thermometer 11. Measurement values obtained by the gas-liquid two-phase flow rate measurement portion 3 are captured by the each-phase flow rate calculating portion 4. Further, measurement values obtained by the mixture liquid density measurement portion 2 are also captured by the each-phase flow rate calculating portion 4, in which the flow rate of each of gas, oil, and water phases are calculated.

In the multi-phase flowmeter 1 of the present invention, a well-known turbine type gas-liquid two-phase flow flowmeter, for example, is combined with the mixture liquid density measurement portion 2. Through the combination with the mixture liquid density measurement portion 2, it is possible to provide a multi-phase flowmeter capable of performing flow rate measurement with markedly high precision. As described below, in order to measure the density of a liquid phase (mixture liquid), the mixture liquid density measurement portion 2 takes in not all but a part of a three-phase flow. Thus, it is possible to provide a multi-phase flowmeter allowing a reduction in size. In the following, the construction and operation of the multi-phase flowmeter 1 of the present invention are described with reference to FIGS. 1 through 7.

As described above, the mixture liquid density measurement portion 2 is provided with the mixture liquid extraction portion 5 and the density measurement portion 6. The mixture liquid extraction portion 5 has an orifice 12, communication pipes 13, a gas-liquid extraction tank 14, a gas-liquid discharge pipe 15, a gas discharge pipe 16, a liquid storage tank 17, and liquid flow rate adjustment valves 18 and 19. The density measurement portion 6 has a mixture liquid introduction pipe 20, a density measurement portion main body 21, and a gas-liquid return pipe 22. The mixture liquid density measurement portion 2 is formed by connecting together the mixture liquid extraction portion 5 and the density measurement portion 6, and has a structure which allows attachment/detachment with respect to a pipe line (main pipe) 23 (e.g., the pipe line (main pipe) 23 can be divided into a portion belonging to the mixture liquid density measurement portion 2 and a portion belonging to the gas-liquid two-phase flow rate measurement portion 3). In the mixture liquid density measurement portion 2, measurement values obtained by the density measurement portion 6 can be captured by the each-phase flow rate calculating portion 4.

The orifice 12 is a pressure difference generator, and is mounted to the pipe line (main pipe) 23. A three-phase flow flows through the pipe line (main pipe) 23. The three-phase flow consists of gas and two kinds of liquid (e.g., oil and water). While there are no particular limitations regarding the gas-liquid two-phase flow in this three-phase flow, this embodiment presupposes a slag flow, a bubble flow, or a linear flow.

Here, various flowing manners of the gas-liquid two-phase flow in a horizontal pipe are briefly described. As is known, the gas-liquid two-phase flow assumes various flowing manners according to how the flow velocities of the gas and liquid are combined with each other. FIG. 3 illustrates such various flowing manners. FIG. 3(a) illustrates a stratified flow, FIG. 3(b) illustrates a wavy flow, FIG. 3(c) illustrates an annular flow, FIG. 3(d) illustrates a bubble flow or a linear flow, FIG. 3(e) illustrates a slag flow, FIG. 3(f) illustrates an annular flow different from that of FIG. 3(c), FIG. 3(g) illustrates a bubble flow, and FIG. 3(h) illustrates an annular mist flow. It is generally said that the flowing state in a pipe line is often that of FIG. 3(d) or FIG. 3(e).

As illustrated in FIG. 3(e), the slag flow has a liquid phase containing bubbles and a phase in which gas and liquid are separated into upper and lower layers, with those two phases appearing alternately. The pressure difference $\Delta P$ generated as a result of the passing of such a slag flow through the orifice 12 is larger in the former phase than in the latter phase. Here, though not shown in particular, it has been found out from measurement of fluctuations in the magnitude of the pressure difference $\Delta P$ that the pressure difference in the former phase is 3.5 times that in the latter phase. That is, due to the slag flow, there is a periodical large fluctuation in the pressure difference $\Delta P$ between the input and output sides of the orifice 12. Further, it has also been found out that the pressure difference $\Delta P$ between the input and output sides of the orifice 12 undergoes great fluctuation in a short period of time (approximately three seconds, which, however, should not be construed restrictively).

The communication pipes 13 are pipes which are connected to the pipe line (main pipe) 23 and through which a part of a three-phase flow is caused to flow. The communication pipes 13 include a gas-liquid extraction pipe or gas-liquid discharge pipe 13a having one end which is connected to the upstream side of the orifice 12, and a gas-liquid extraction pipe or gas-liquid discharge pipe 13b connected to the downstream side of the orifice 12 (While it is also possible to provide only the upstream side pipe, it is more desirable to provide the pipes on both sides). The communication pipes 13, which include the gas-liquid extraction pipes or gas-liquid discharge pipes 13a and 13b, are in a pair, and in the example illustrated, are arranged and formed so as to extend in parallel in a predetermined length, downwardly from the pipe line (main pipe) 23. When a valve 24 is provided in the middle of each of the pair of communication pipes 13 (gas-liquid extraction pipes or gas-liquid discharge pipes 13a and 13b), and the opening/closing of those valves 24 is automatically controlled, it is possible to perform measurement in an arbitrary time period. In this embodiment, the valves 24 are totally open, and, while a three-phase flow passes through the pipe line (main pipe) 23, measurement is continued.

The gas-liquid extraction tank 14 is a container having an inner space of a desired volume (e.g., approximately 1 L; hereinafter, the letter "L" stands for liter), and the other ends of the pair of communication pipes 13 (gas-liquid extraction pipes or gas-liquid discharge pipes 13a and 13b) are connected thereto. In FIGS. 2 and 4 (of which FIG. 4 is a schematic view), a part of a three-phase flow is captured by the gas-flow extraction tank 14 to be accumulated therein to some degree, whereby the following phenomenon occurs in the gas-liquid extraction tank 14. That is, the pressure difference $\Delta P$ between the input and output sides of the orifice 12 undergoes a great change in a short period of time, and hence the extraction flow rate of the part of the three-phase flow taken in from the upstream side gas-liquid extraction pipe or gas-liquid discharge pipe 13a (In some cases, it is simply expressed as the gas-liquid) fluctuates. In particular, the large bubbles in the gas-liquid are injected into the gas-liquid extraction tank 14 like a jet from an air gun, and generates a large agitation flow in the entire gas-liquid extraction tank 14. The agitation flow 25 generated in the gas-liquid extraction tank 14 connects small bubbles together to cause them grow into larger bubbles, and promotes the separation of the gas. Further, the agitation flow 25 gathers bubbles in the upper portion of the gas-liquid extraction tank 14, and forces them into the downstream side gas-liquid extraction pipe or gas-liquid discharge pipe 13b along with the liquid, generating the operation of discharging them into the pipe line (main pipe) 23.

The downstream side gas-liquid extraction pipe or gas-liquid discharge pipe 13b mainly discharges gas entraining liquid. When, due to the fluctuation in the pressure difference $\Delta P$ between the input and output sides of the orifice 12, the pressure on the downstream side of the orifice 12 is high, and the pressure in the gas-liquid extraction tank 14 is low, gas-liquid is sent into the gas-liquid extraction tank 14 from the downstream side gas-liquid extraction pipe or gas-liquid discharge pipe 13b, and there is locally formed a small agitation flow 26 with respect to the overall agitation flow 25. Like the overall agitation flow 25, the small agitation flow 26 contributes to the separation of the gas. When the small agitation flow 26 is generated, there has been generated a reverse flow in the downstream side gas-liquid extraction pipe or gas-liquid discharge pipe 13b, and hence no gas-liquid is discharged from the downstream side gas-liquid extraction pipe or gas-liquid discharge pipe 13b. However, in the vicinity of the position where the downstream side gas-liquid extraction pipe or gas-liquid discharge pipe 13b is connected, the small agitation flow 26 is generated, and hence the separated gas is easily discharged afterwards. The effect described above is obtained by forming the communication pipes 13 (gas-liquid extraction pipes or gas-liquid discharge pipes 13a and 13b) as a pair.

The discharge of the gas existing in the upper portion of the gas-liquid extraction tank 14 is described. The bubbles separated by the large agitation flow 25, etc. are gathered in the upper portion of the gas-liquid extraction tank 14, and are discharged while entraining the liquid through the valve 27 and the gas-liquid discharge pipe 15. In this embodiment, the discharge destination is a cross valve 41 described below provided in the gas-liquid return valve 22 of the density measurement portion 6 (which is to be construed as an example).

Under the gas-liquid extraction tank 14, there is provided a mixture liquid extraction pipe 28. The mixture liquid extraction pipe 28, which has a caliber of approximately 40 mm, is a pipe erect below the gas-liquid extraction tank 14, and is formed in a length of, for example, approximately 100 mm. The mixture liquid extraction pipe 28 contains a structure 29 which has a longitudinal length corresponding to approximately ⅔ thereof and includes narrow tubes bundled together. In the structure 29, formed by bundling together, for example, narrow tubes having an inner diameter of approximately 2 mm, the narrow tubes are bundled so as to be held in outward contact with each other. The structure 29, formed by bundling together narrow tubes, is formed into a cylinder (column), and can be inserted into the mixture liquid extraction pipe 28 for installation therein (When the caliber of the mixture liquid extraction pipe 28 is set to a caliber of 40 mm, the number of narrow tubes is approximately ninety). The structure 29, formed by bundling narrow tubes together, is provided for the purpose of preventing the bubbles in the gas-liquid extraction tank 14 from flowing into the liquid storage tank 17 (In the case in which no bubbles are likely to flow into the liquid storage tank 17, there is no need to install the structure. In this embodiment, the structure is installed for the sake of safety. If, for example, the gas void fraction is low, there is no need to install the structure). The portion corresponding to the mixture liquid extraction pipe 28 functions as a filter. The narrow tubes may be replaced by a plate with small holes.

The liquid flow rate adjustment valve 18 is provided at some midpoint in a connection pipe 30 connecting the gas-liquid extraction tank 14 and the liquid storage tank 17. The opening of the liquid flow rate adjustment valve 18 is adjusted such that the flow rate of the mixture liquid is, for example, approximately 2 to 6 L/min. The liquid flow rate adjustment valve 18 is provided for the purpose of supplying an appropriate amount of mixture liquid to the liquid storage tank 17.

The mixture liquid from which the gas has been removed on the gas-liquid extraction tank 14 side flows into the liquid storage tank 17. The liquid storage tank 17 is formed as a container in which the mixture liquid is temporarily accumulated (Its volume is set, for example, to 0.5 L). The liquid storage tank 17 is structured such that mixture liquid stays therein for, for example, approximately 10 minutes. Taking into account a case in which the gas therein cannot be extracted completely and a case in which minute bubbles are contained in the mixture liquid, the liquid storage tank 17 is designed to be capable of discharging gas and bubbles to the cross valve 41 described below via a valve 31 and the gas discharge pipe 16. In this embodiment, the liquid storage tank 17 is structured such that it can take in at least the mixture liquid for density measurement required at the density measurement portion 6 and can store the same therein.

The liquid flow rate adjustment valve 19 is provided at some midpoint in a connection pipe 32 connecting the liquid storage tank 17 and the mixture liquid introduction pipe 20 of the density measurement portion 6. The opening of the liquid flow rate adjustment valve 19 is adjusted such that an appropriate flow rate of the mixture liquid is attained. In a specific example, the opening is adjusted such that it takes, for example, approximately 10 to 30 seconds for the mixture liquid to pass through a Coriolis meter 38 described below in the density measurement portion main body 21 of the density measurement portion 6 (In the case of a Coriolis meter 38 having a caliber of 25 mm, the flow rate is approximately 0.5 to 1.5 L/min). At the position of the liquid flow rate adjustment valve 19, solely the mixture liquid (e.g., oil/water) flows to the density measurement portion 6.

The mixture liquid introduction pipe 20 of the density measurement portion 6, to which the connection thin pipe 32 is connected, is provided with a valve 33 and a discharge valve 34. Further, a sub bypass pipe 35 has one end connected to the mixture liquid introduction pipe 20 to go around the density measurement portion main body 21, has the other end connected to the gas-liquid return pipe 22, and is also provided with a valve 36. In this embodiment, the valve 33 is totally open, and the discharge valve 34 and the valve 36 are totally closed. The valve 33 is provided on the density measurement portion main body 21 side.

In this embodiment, the density measurement portion main body 21 is provided with a homogenizer 37, the Coriolis meter 38, and a mixture liquid return pipe 39. The homogenizer 37 is provided for the purpose of homogenizing the mixture liquid to make the mixture liquid density even. The homogenizer 37 is provided on the upstream side of the Coriolis meter 38. The homogenizer 37 is provided in the vicinity of the Coriolis meter 38 and makes the measurement of the mixing density by the Coriolis member 38 more reliable. It is only necessary for the Coriolis meter 38 to be a well-known Coriolis mass flowmeter capable of density measurement (or one capable of density measurement on the same principle). In this embodiment, a well-known Coriolis mass flowmeter is used as the Coriolis meter 38. The density measurement by the Coriolis meter 38 does not depend on the flow velocity of the mixture liquid (The measurement is effected through oscillation of mixture liquid filling a built-in tube), and hence it is possible to perform measurement with a low flow rate.

The gas-liquid return pipe 22 is provided with a valve 40, the cross valve 41, and a check valve 42 in that order from the Coriolis meter 38 side. The valve 40 is totally open. The cross valve 41 and the check valve 42 are well-known valves, and a description of their operation, etc. is omitted. The gas-liquid return pipe 22 is connected to the pipe line (main pipe) 23 on the downstream side of the orifice 12 of the mixture liquid extraction portion 5 (Reference numeral 43 denotes the joint portion).

As described above, the gas-liquid two-phase flow rate measurement portion 3 is provided with the homogenizer 7, the turbine meter 8, the differential pressure gage 9, the pressure gage 10, and the thermometer 11. The gas-liquid two-phase flow rate measurement portion 3 is of the same construction as the turbine flowmeter as disclosed in Patent Document 3 in the background art section (JP 08-201130 A), and hence a specific description of its construction is omitted here (The measurement method is described below). As illustrated in FIG. 5, the gas-liquid two-phase flow rate measurement portion 3 may be provided with a volumetric flowmeter 44, a venturi pipe 45, a differential pressure gage 46, etc. The reason for adopting a turbine flowmeter in this embodiment (which is not restricted to the turbine flowmeter of the above-mentioned publication) is that a turbine flowmeter can obtain the total volume flow rate and the gas-liquid volumetric flow rate ratio simultaneously and efficiently in the state in which the gas-liquid two-phase flow remains a mixed phase flow. Further, the turbine flowmeter is superior in terms of cost and operability (Apart from this, it is advantageous in that a common industrial gage is used and that it is applicable to high pressure specifications as in the case of an oil field through appropriate flange standard only).

As described above, the each-phase flow rate calculating portion 4 can taken in the measurement value obtained by the gas-liquid two-phase flow rate measurement portion 3 and the measurement valve obtained by the mixture liquid density measurement portion 2 to calculate each-phase flow rate of a three-phase flow (e.g., gas, oil, and water). The each-phase flow rate calculating portion 4 can be formed, for example, as a part of a controller (not shown), or a combination of the respective computation portions of the gas-liquid two-phase flow rate measurement portion 3 and the Coriolis meter 38, and can calculate each-phase flow rate by the function of a microcomputer or the like. In the each-phase flow rate calculating portion 4, the mixing ratio of the mixture liquid is obtained form the mixture liquid density, and each flow rate of the mixture liquid is calculated from the mixing ratio and the mixture liquid flow rate.

Next, a gas-liquid two-phase flow measurement method using a turbine flowmeter is described (in the form of a summary). The gas-liquid in a mixed phase state is homogenized by the homogenizer 7 installed on the upstream side into a state as if the gas-liquid consists of one kind of fluid before flowing into a turbine rotor of the turbine meter 8. The density of the mixture fluid is made even by the homogenizer 7, and hence the momentum of the mixture fluid acting on the turbine rotor is fixed in the radial direction of the rotor. The turbine rotor rotates efficiently. The pressure difference $\Delta P$ generated on the input and output sides of the homogenizer 7 is experimentally turned into a function by the flow rate QM of the gas-liquid and the proportion of the gas flow rate QG with respect to QM (gas void fraction $\beta$) as follows: $\Delta P \propto f(QM)*f(QM)*f(\beta)$. The rpm N of the turbine rotor is expressed as $N \propto f(QM)$, and hence it is possible to obtain QM and $\beta$ from those two formulas by measuring $\Delta P$ and N. The flow rate QL of the liquid in the mixture fluid is calculated as $QL=QM*(1-\beta)$, and the flow rate QG of the gas in the mixture fluid is calculated as $QG=QM*\beta$.

A description related to the density measurement by the Coriolis meter 38 is given. Here, the mixture liquid is regarded as an oil/water mixture liquid. Further, it is presupposed that the respective densities of oil and water in each single phase are well known.

The water cut $\alpha$ is calculated as follows: $\alpha=$(oil/water mixing density−oil density)/(water density−oil density). In the following, a specific description is given regarding this formula of the water cut $\alpha$. The respective mass flow rates of oil and water and the mass flow rate of the oil/water obtained by adding them together are equal, and hence the following equation (1) is obtained:

$$QW*\rho W+QO*\rho O=QL*\rho L \quad (1)$$

where QW is the flow rate of water, QO is the flow rate of oil, QL is the flow rate of what is obtained by adding water and oil together, $\rho W$ is the density of water, $\rho O$ is the density of oil, and $\rho L$ is the density of what is obtained by adding oil and water together. Equation (1) can be transformed as follows: $QO=QL*QW$, and hence $QW*(\rho W-\rho O)=QL*(\rho L-\rho O)$. The water cut $\alpha=QW/QL$, and hence the water cut $\alpha=(\rho L-\rho O)/(\rho W-\rho O)$.

The flow rate QO of oil and the flow rate QW of water can be obtained by multiplying, by the water cut $\alpha$, the flow rate QL of liquid in the mixture fluid described in relation to the method of measuring a gas-liquid two-phase flow using a turbine flowmeter as follows: $QO=QL*(1-\alpha)$, and $QW=QL*\alpha$.

As described above with reference to FIGS. 1 through 5, in the multi-phase flowmeter of the present invention, high precision density measurement is performed by the mixture liquid density measurement portion 2, and hence it is possible to finally calculate the flow rate QO of oil and the flow rate QW of water with high precision.

A supplementary description is given regarding the mixture liquid density measurement portion 2 of the multi-phase flowmeter 1 of the present invention. In order to extract a part of a three-phase flow from the pipe line (main pipe) 23, in other words, in order to extract a gas-liquid, there are used the pair of communication pipes 13 (gas-liquid extraction pipes or gas-liquid discharge pipes 13a and 13b) connected in a bypass-like fashion to the upstream and downstream sides of the orifice 12 installed in the pipe line (main pipe) 23, and the gas-liquid extraction tank 14. When a slag flow or the like flows through the pipe line (main pipe) 23, the pressure difference between the input and output sides of the orifice 12 changes periodically. With this, extraction of gas-liquid and discharge mainly of gas (discharge into the pipe line (main pipe) 23) are simultaneously effected in the pair of communication pipes 13 (gas-liquid extraction pipes or gas-liquid discharge pipes 13a and 13b) and in the gas-liquid extraction tank 14. Within the gas-liquid extraction tank 14, the gas-liquid is forcibly shaken horizontally, vertically, etc. to be thereby agitated, and the gas entraining the liquid is discharged. As a result, the gas-liquid of high liquid-phase rate remains in the gas-liquid extraction tank 14. Then, the gas is removed from this gas-liquid of high liquid-phase rate to thereby extract the mixture liquid, which is accumulated in the liquid storage tank 17. The mixture liquid flows from the liquid storage tank 17 in an amount required at the Coriolis meter 38, and the density of the mixture liquid is made uniform at the homogenizer 37, with the result that high precision density measurement is performed at the Coriolis meter 38.

Next, test results are described with reference to FIGS. 6 and 7. The test specifications were as follows: the caliber of the pipe line (main pipe) 23 including the turbine meter 8 was 50 mm. The flow rate QL of oil/water was 4 to 15 m3/h, the gas void fraction $\beta$ was 0 to 85%, and the water cut $\alpha$ was 5 to 30% ("m3" means cubic meter). FIG. 6 is a graph illustrating the results of measurement of the oil/water density in oil/water vapor as obtained by the Coriolis meter 38. In the graph, ±3 Kg/m3 corresponds to a density measurement precision of ±0.3% or more. Usually, in the conventional multi-phase flow rate system, a density measurement precision of ±0.5% or more is required, which means a satisfactory result was obtained in the present invention. FIG. 7 is a graph illustrating the results of measurement of the water cut (water/oil) in oil/water vapor as obtained by the Coriolis meter 38. As illustrated in the graph, a satisfactory measurement precision of ±2.5% was obtained regarding the water cut $\alpha$.

As is known, when measuring the density to calculate the water cut $\alpha$, the error in density measurement increases. Assuming that the density of mixture liquid is $\rho L$, that the density of oil is $\rho O$, that the density of water is $\rho W$, that the error in measurement density is $\gamma \rho L$, and that the error in water cut is γα, α=(ρL−ρO)/(ρW−ρO), and hence γα=1/(ρW−ρO)*γρL. That is, γα increases by 1/(ρW−ρO) times γρL. For example, assuming that the water density ρW=1 g/cm3, and that the oil density ρO=0.85 g/cm3, γα= 1/(ρW−ρO)*γρL=1/(1−0.85)*γρL≈7*γρL, which means an increase by seven times. Thus, in this case, even if the density measurement is 0.5%, the water cut calculation is 3.5%. In the present invention, the density measurement precision is ±0.3% or more, whereas the measurement precision attained in this case is ±2.5%. This indicates an increase by almost seven times, and is consistent with theory.

As described above with reference to FIGS. 1 through 7, there is attained an effect that the present invention can provide the multi-phase flowmeter 1 capable of high precision flow rate measurement.

Figure 8:
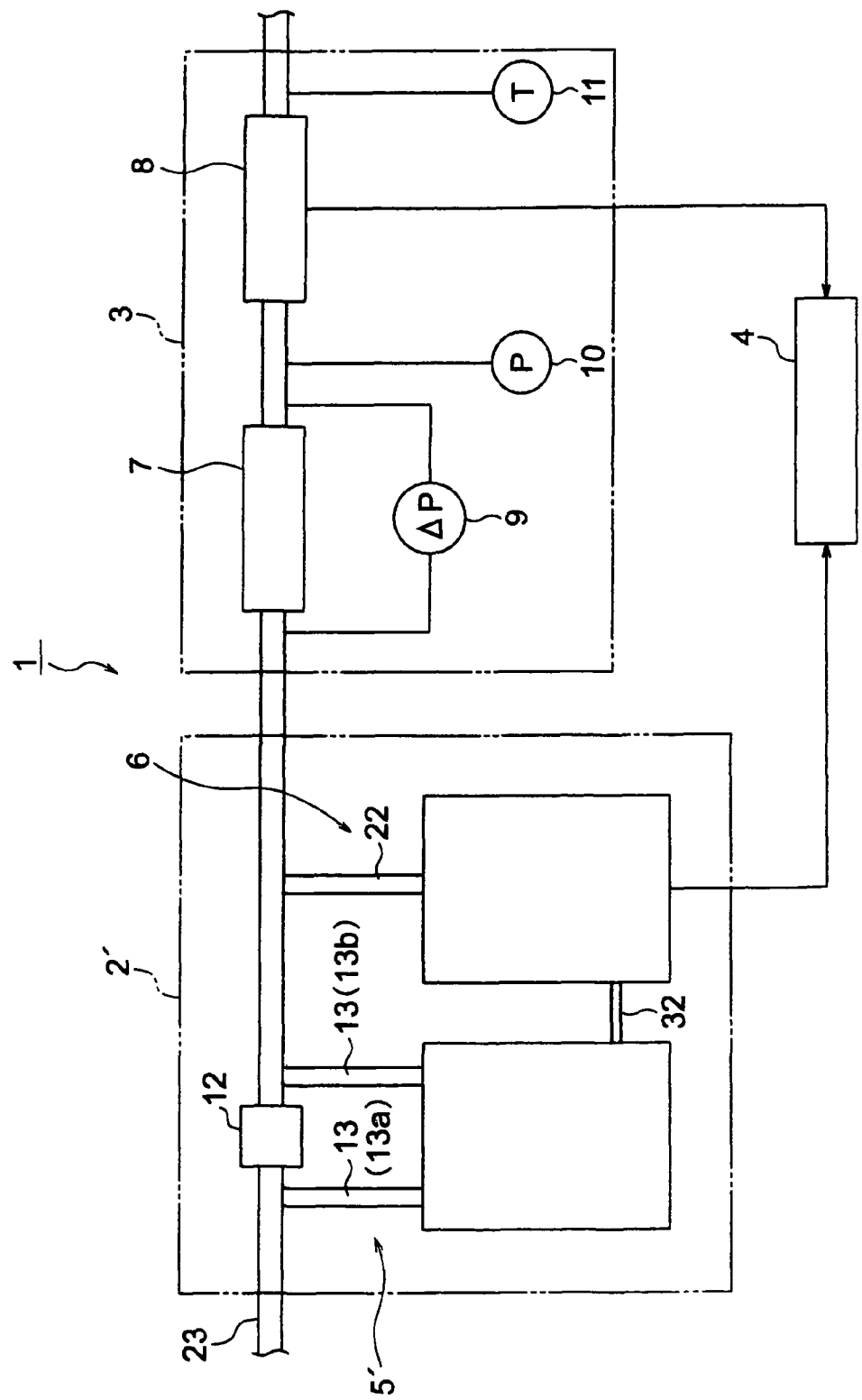
FIG. 8 is a structural diagram of a multi-phase flowmeter according to another embodiment of the present invention.
Figure 9:
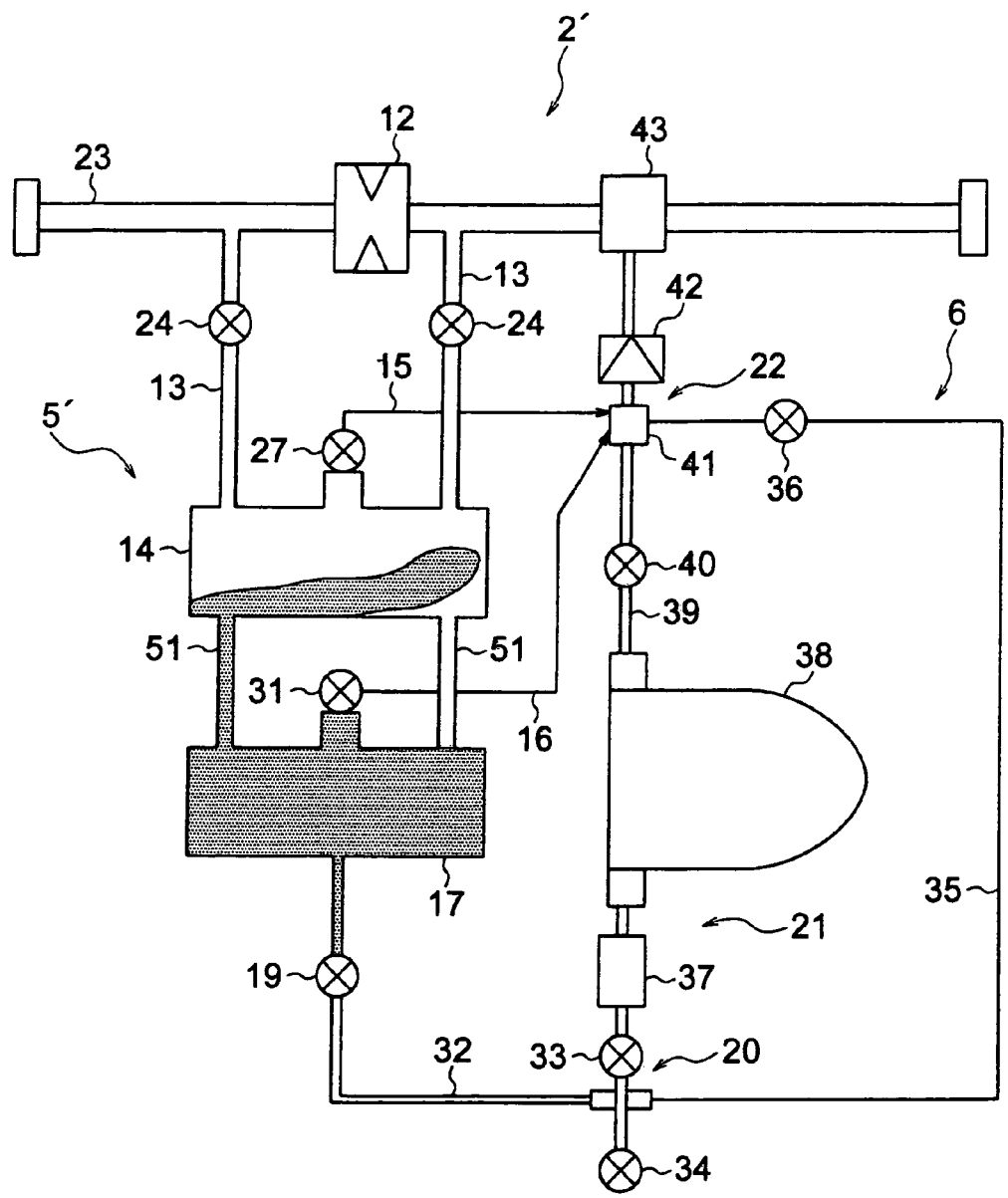
FIG. 9 is a structural diagram of a mixture liquid density measurement portion.
Figure 10:
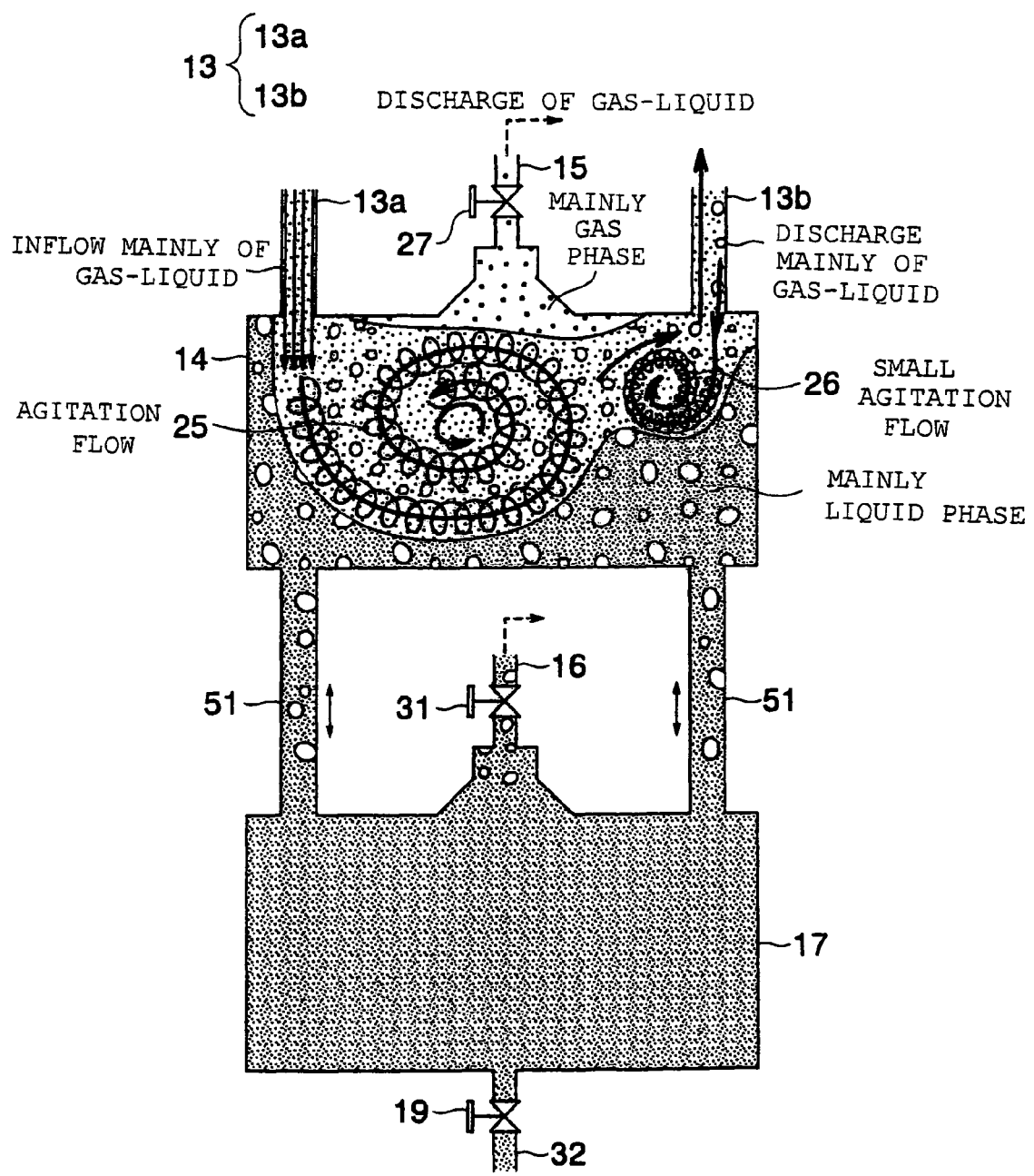
FIG. 10 is an explanatory view illustrating the condition in a gas-liquid extraction tank.
Figure 11:
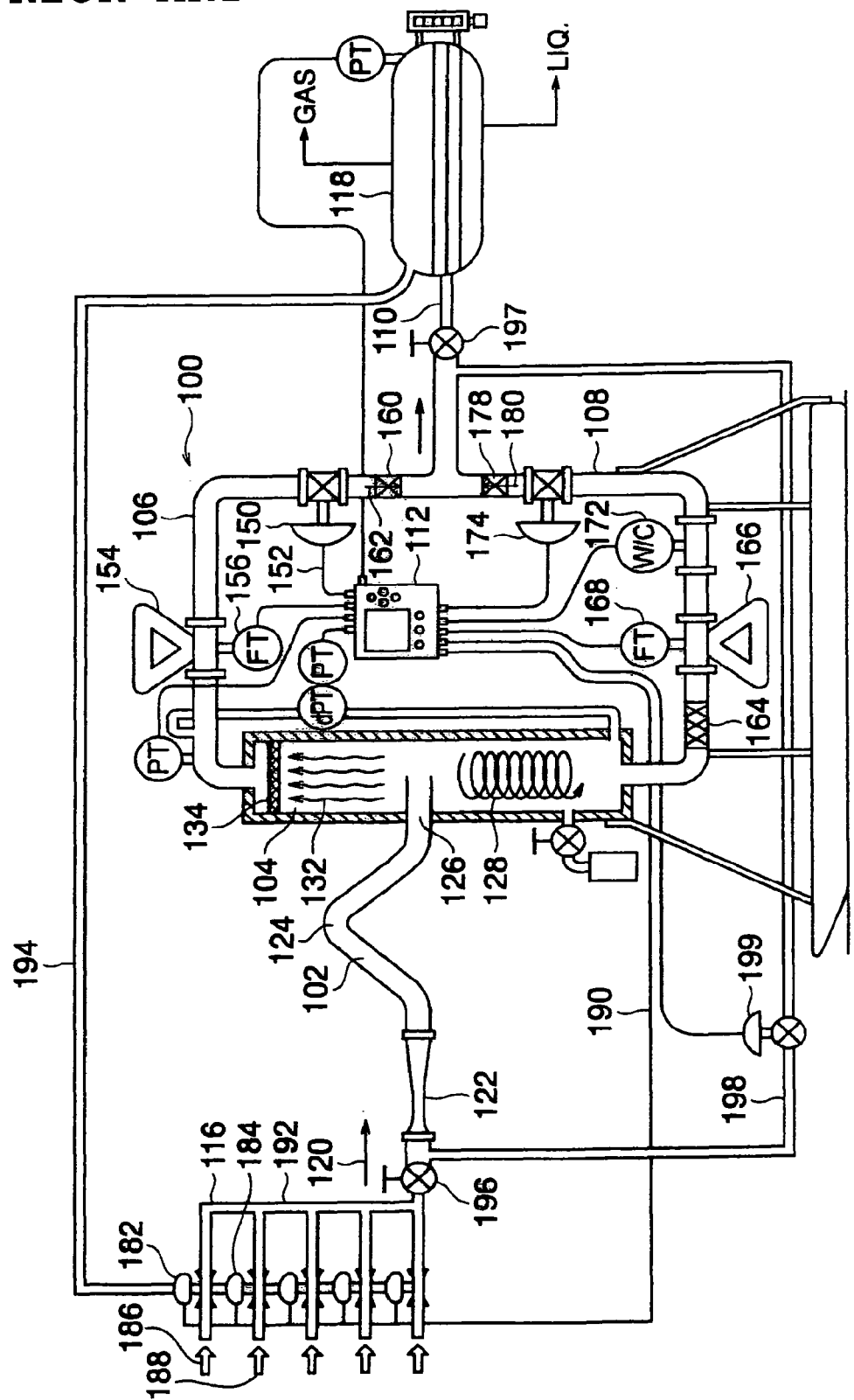
FIG. 11 is a structural diagram of a conventional multi-phase flow measurement system.

Next, another embodiment of the present invention is described with reference to FIGS. 8 through 10. FIG. 8 is a structural diagram of a multi-phase flowmeter according to an embodiment of the present invention, FIG. 9 is a structural diagram of a mixture liquid density measurement portion, and FIG. 10 is an explanatory view illustrating the condition in a gas-liquid extraction tank. The components that are basically the same as those of the above-mentioned embodiment are denoted by the same reference numerals, and a description thereof is omitted.

In FIG. 8, a multi-phase flowmeter 1' according to another embodiment of the present invention includes a mixture liquid density measurement portion 2', a gas-liquid two-phase flow rate measurement portion 3, and an each-phase flow rate calculating portion 4. The mixture liquid density measurement portion 2' is provided with a mixture liquid extraction portion 5' and the density measurement portion 6. The mixture liquid extraction portion 5' has the orifice 12, the pair of communication pipes 13 (gas-liquid extraction pipes or gas-liquid discharge pipes 13a and 13b), the gas-liquid extraction tank 14, the gas-liquid discharge pipe 15, the gas discharge pipe 16, the liquid storage tank 17, the liquid flow rate adjustment valve 19, and a pair of communication pipes 51.

The mixture liquid extraction portion 5' differs from the mixture liquid extraction portion 5 only in the way the gas-liquid extraction tank 14 and the liquid storage tank 17 are connected to each other. That is, the gas-liquid extraction tank 14 and the liquid storage tank 17 are connected to each other by the pair of communication pipes 51 instead of the mixture liquid extraction pipe 28, the connection pipe 30, and the liquid flow rate adjustment valve 18 existing in FIGS. 2 and 3. In the mixture liquid extraction portion 5', the extraction of gas-liquid and the discharge mainly of gas entraining liquid, generated in the pair of communication pipes 13 (gas-liquid extraction pipes or gas-liquid discharge pipes 13a and 13b) and the gas-liquid extraction tank 14, are to be effected in a number of stages. In the mixture liquid extraction portion 5', the pair of communication pipes and the tank are constructed in a number of stages (In the drawing, the portion corresponding to the pair of communication pipes 51 and the liquid storage tank 17 constitutes the second stage; the number of stages may be three or more), whereby it is possible to send mixture liquid which has attained separation of small bubbles to the density measurement portion 6 (The basic operation and effect are the same as those of the above-mentioned embodiment, and hence a description thereof is omitted).

Apart from this, it goes without saying that the present invention allows various modifications without departing from the gist of the invention.

For example, the mixture density measurement portion 2 (mixture density measurement portion 2') may be arranged on the downstream side of the gas-liquid two-phase flow rate measurement portion 3.

The invention claimed is:

1. A multi-phase flowmeter comprising:
   a gas-liquid two-phase flow rate measurement portion for measuring an each-phase flow rate of a gas-liquid two-phase flow in a three-phase flow consisting of gas and two kinds of liquid;
   a mixture liquid density measurement portion for measuring a mixture density of mixture liquid as a liquid phase of the gas-liquid two-phase flow; and
   an each-phase flow rate calculating portion which obtains a mixing ratio of the mixture liquid from the mixture density and which calculates each flow rate of the mixture liquid from the mixing ratio and the mixture liquid flow rate,
   wherein the mixture liquid density measurement portion includes a mixture liquid extraction portion and a density measurement portion connected to the mixture liquid extraction portion,
   wherein the mixture liquid extraction portion includes a pressure difference generator provided in a pipe line through which the three-phase flow is passed, a pair of communication pipes connected to upstream and downstream sides of the pressure difference generator, a gas-liquid extraction tank which serves as a place connected to the pair of communication pipes and adapted to take in a part of the three-phase flow and which serves as a place utilizing a change in pressure between input and output sides of the pressure difference generator to forcibly agitate the part of the three-phase flow, a gas-liquid discharge pipe connected to the gas-liquid extraction tank and adapted to discharge gas including the liquid phase, a liquid storage tank connected to the gas-liquid extraction tank and adapted to take in at least the mixture liquid for density measurement required at the density measurement portion and to store the same, and a liquid flow rate adjustment valve provided at least on a downstream side of the liquid storage tank, and
   wherein the density measurement portion includes a density measurement portion main body adapted to perform density measurement by using the mixture liquid for density measurement, and a gas-liquid return pipe connected to the density measurement portion main body and the pipe line.

2. A multi-phase flowmeter according to claim 1, wherein the gas-liquid two-phase flow is a slag flow, a bubble flow, or a linear flow.

3. A multi-phase flowmeter according to claim 2, wherein the mixture liquid density measurement portion, or the mixture liquid density measurement portion and the gas-liquid two-phase flow rate measurement portion, are detachable with respect to the pipe line.

4. A multi-phase flowmeter according to claim 1, wherein the mixture liquid density measurement portion, or the mixture liquid density measurement portion and the gas-liquid two-phase flow rate measurement portion, are detachable with respect to the pipe line.

* * * * *